United States Patent [19]  
Lindow et al.

[11] Patent Number: 4,847,823  
[45] Date of Patent: Jul. 11, 1989

[54] METHOD AND APPARATUS FOR READING OR MEASURING MAGNETO-OPTICAL STORAGE MEDIA USING PINHOLE APERTURE

[75] Inventors: James T. Lindow, Saratoga; Simon D. Bennett, San Jose; Ian R. Smith, Los Gatos, all of Calif.

[73] Assignee: SiScan Systems, Inc., Campbell, Calif.

[21] Appl. No.: 63,668

[22] Filed: Jun. 19, 1987

[51] Int. Cl.⁴ .............................................. G11B 7/00
[52] U.S. Cl. ..................................... 369/110; 369/13; 360/114
[58] Field of Search ................... 360/114; 365/122; 369/13, 110, 53, 54, 58; 356/72

[56] References Cited

U.S. PATENT DOCUMENTS 4,655,590 4/1987 Aagano et al. ...................... 356/72

Primary Examiner—Robert L. Richardson  
Attorney, Agent, or Firm—Robert S. Kelly

[57] ABSTRACT

A scanning confocal optical imaging system is utilized to read or measure data magnetically recorded on a magneto-optic disk. The system includes a laser for producing a linearly polarized beam and a beam splitter for directing the transmitted beam to the disk and for deflecting a portion of the reflected return beam from the disk to a photodetector. A pinhole plate is placed between the beam splitter and the disk for restricting the size of the transmitted and reflected beams, and a polarizer is positioned between the beam splitter and the photodetector to receive the deflected return beam and provide an output that discriminates between the differing directions of rotation of the polarization plane of the transmitted beam by the magnetized area on the disk so that the direction of magnetization of the magnetized area can be read by the photodetector.

12 Claims, 1 Drawing Sheet

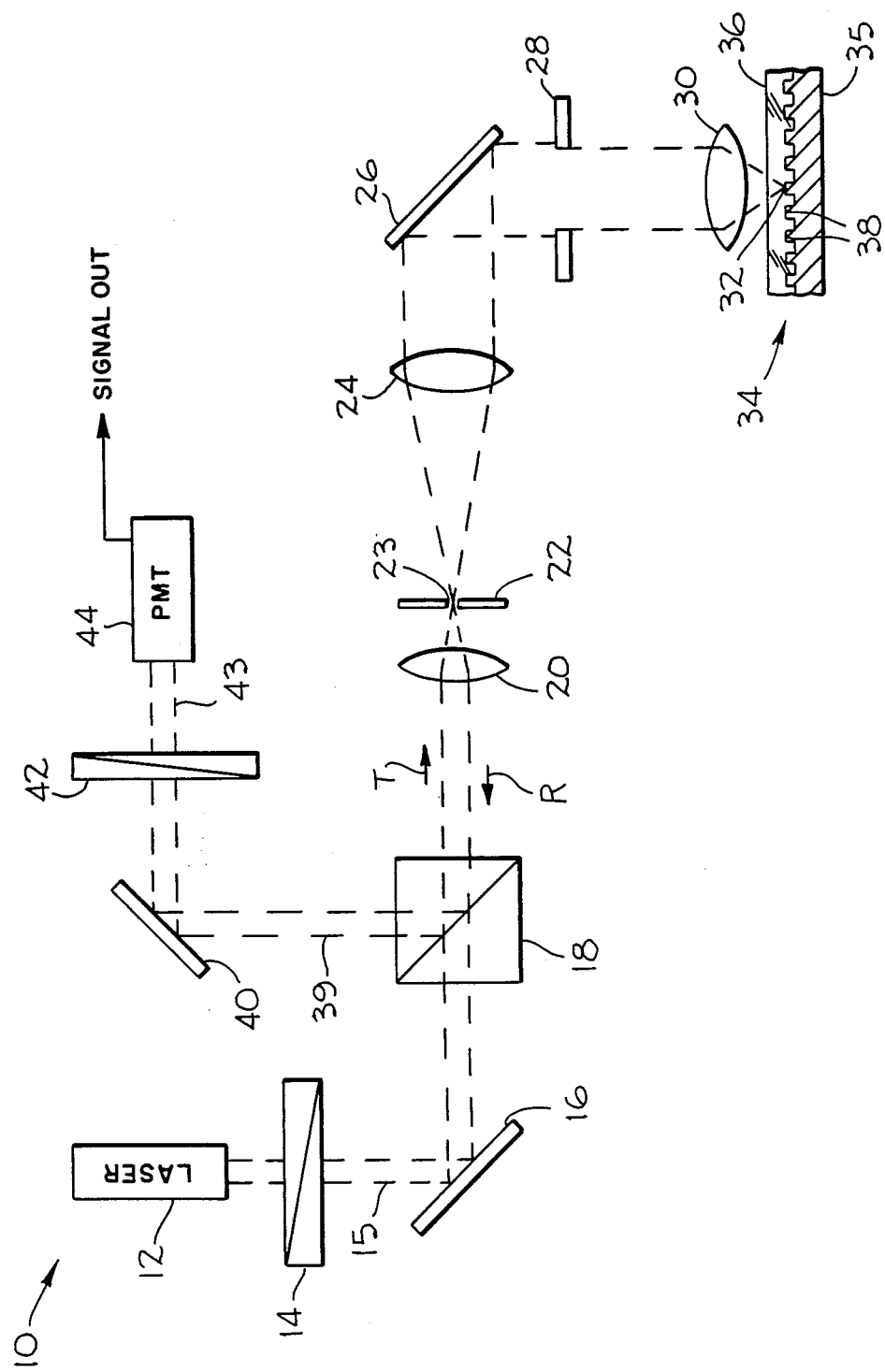

METHOD AND APPARATUS FOR READING OR MEASURING MAGNETO-OPTICAL STORAGE MEDIA USING PINHOLE APERTURE

BACKGROUND OF THE INVENTION

1. Field of the Invention

The present invention pertains to scanning optical systems for reading information recorded in a magnetic recording medium, and more particularly, it pertains to such systems which utilize a polarized light source and a detector for detecting the slight rotation of light caused by the Faraday or polar Kerr effect when the light is reflected from a previously magnetized area on the medium.

2. Description of the Prior Art

Erasable magneto-optic recording is viewed as a possible successor to electromagnetic recording that is used today in high performance disk drives for main frame computers, hard disks, and floppy disks for Personal computers and magnetic tape drives. Magneto-optic recording offers bit densities (approximately $10^8$ bits per square centimeter) ten times that of high performance disk drives and fifty to one hundred times the density of the low-end disk drives. The optical recording and reading head is typically positioned at least one millimeter above the disk surface which arrangement eliminates the possibility of head crashes and also allows the disk to be readily removed. Rigid plastic disks with grooved recording tracks on 1.6 micron centers can be rotated at speeds as high as conventional Winchester drives. Since bit density along the track is comparable to today's Winchester technology, data rates can be the same.

Thermomagnetic recording is used in magneto-optic recording technology for writing information on the storage medium. The medium material is heated above a critical temperature by a diode laser beam the energy of which is concentrated on a very small spot on the target at the focal point of the beam, and the heated spot is allowed to cool in a magnetic field. The direction of the magnetic field, which is normal to the disk surface, determines the direction of the magnetization in the recording. In writing on the disk a diode laser provides the heat source by means of a beam which is passed to an objective lens to focus the beam on the spot on the disk. A bias magnetic field is provided by a coil positioned adjacent to the disk and operable to selectively vary the direction of magnetization as the disk is rotated with respect to the beam.

In reading the information recorded upon the disk, the directions of magnetization are detected by a focused laser beam utilizing either the polar Kerr or the Faraday magneto-optic effect. When a linearly polarized light beam is reflected from the surface of a vertically magnetized material there is a rotation of the plane of polarization (the polar Kerr effect). The sense of the rotation depends upon the direction of magnetization in the magnetic material. In a typical optical reading system, a laser beam is first linearly polarized and then passed through a beam splitter and an objective lens which focuses the polarized beam on the surface of the magneto-optic disk. The beam reflected from the magnetic material surface will have its plane of polarization rotated about $\frac{1}{4}$ to $\frac{1}{2}$ degree due to the polar Kerr magneto-optic effect with the direction of rotation being due to the direction of magnetization of the disk surface, e.g., with a positive polarization plane rotation (angle $X$) indicating a binary "one" and a negative rotation (angle $-X$) indicating a binary "zero". The polarization rotated reflected beam passes back through the objective lens to the beam splitter wherein a portion of it is deflected to an analyzer which has its polarization direction set perpendicularly to the polarization direction of one of the polarization rotated beams reflected from the disk, e.g., set perpendicularly to the angle $-X$. Thus the analyzer discriminates between the two polarization rotated beams by producing essentially no output beam for the $-X$ beam and producing an output beam equal to the sin $2X$ component of the $+X$ beam. A conventional photodetector reads the analyzer output to provide the indicated digital output signal, i.e., a "one" or a "zero" for respectively positive or negative polarization angle rotation. Alternatively, the information (i.e., "ones" or "zeros") can be provided by areas of magnetization and non-magnetization on the magneto-optic disk surface. Analysis can then be made by simply discriminating between a plane polarization rotated reflected signal and a non-rotated reflected signal (e.g., by a single polarizer).

Examples of typical optical systems used in magneto-optic reading systems of the prior art are shown in U.S. Pat. No. 4,409,631 to Matsumoto.

SUMMARY OF THE INVENTION

With the present invention, a confocal scanning optical system is utilized for reproducing the information recorded in the magnetic storage medium. This has the advantage of permitting an extremely small but sensitive detecting spot to be utilized by the optical system thereby increasing the sensitivity to changes in magnetically recorded information on the media surface and permitting greater bit densities in a given storage area.

Briefly, the optical system of the present invention includes a source for a polarized light beam, a beam splitter positioned in the path of the beam, and an objective lens for focusing the beam upon the magneto-optic storage medium. A key feature of the present invention is the use of a pinhole plate positioned between the beam splitter and the storage medium for transmitting the beam from the source to the medium and for also receiving the reflected beam from the medium. As with conventional systems the deflected light at the beam splitter is directed to an analyzer or polarizer the polarizing direction of which is orthogonal to one of the rotated reflected beam polarization directions so as to discriminate between the positive and negative polarization plane rotation angles by which the reflected beam has been rotated relative to the source beam. A conventional photodetector receives the output of the discriminating polarizer to provide an output signal indicative of the direction of magnetization of the medium.

Using conventional data tracks as found on magneto-optic disks in use today, the information thereon is not only capable of being read with the system of the present invention but the size, shape and spacial location of the magnetized areas on the data tracks can be measured with a high degree of accuracy. Furthermore, the sensitivity of the system is such that increased bit densities can be utilized in the magnetic storage media and successfully read with the present invention.

BRIEF DESCRIPTION OF THE DRAWING

The drawing shows in diagramatic form one embodiment of the scanning optical system of the present invention.

DESCRIPTION OF THE PREFERRED EMBODIMENT

With reference to the drawing it will be seen that the optical system 10 of the present invention includes a laser beam source 12 which, in conjunction with a high quality polarizer 14, provides a linearly polarized beam 15. The light beam is turned by a mirror 16 and directed through a beam splitter 18. While either a conventional beam splitter or a polarizing beam splitter could be used with the present invention, the embodiment described utilizes a polarizing beam splitter with its orientation being such that the light beam with a polarization direction of beam 15 incident upon the face of the beam splitter will pass directly therethrough (in the direction of the indicated arrow T). Incident beams reflected back (in the direction of the indicated arrow R) from internal elements in the optical system will also pass directly through the beam splitter. However, beams which have their polarization direction rotated by the magnetized medium 34 and are reflected back through the optical system will be partially deflected by the beam splitter 18 with that component of the reflected beam orthogonal to the polarization direction of beam 15 being deflected from the perpendicularly located exit face axis of the beam splitter cube 18 along beam path 39, as indicated in the drawing. If a conventional beam splitter is used at 18, then a separate polarizer must obviously be used to discriminate between the non-rotated beams and the polarization rotated beams. Furthermore, if a media writing system of one-direction magnetization or no magnetization is used, then only one such polarizer or analyzer is needed in the system, e.g., at 42.

It is an important feature of the present invention that a confocal optical system be provided to enhance the imaging properties and improve the overall performance. Thus, a pinhole plate 22 is provided in the beam path between the beam splitter 18 and the magneto-optic disk 34 with a small pinhole 23 being located therein. The pinhole must be smaller than the Airy disk of the reflected beam R; thus, it should be in the micron diameter range for the scanning of conventional magneto-optic disks, e.g., at a diameter in the order of about 1–10 microns. An objective lens 20 focuses the transmitted beam 15 at the pinhole 23 and an expansion lens 24 recollimates the beam after it has passed through the pinhole plate; thus, the combination of lens 24 and lens 30 of the system serve to focus the beam 15 to a diffraction limited spot on the disk 34.

In order to direct the beam 15 vertically onto the face of the rotating magneto-optic disk 34, a turning mirror 26 is provided and the objective lens 30 is utilized to focus the beam at focal point 32 in the disk. An iris or controlled apperture device 28 is provided to stop down the beam to the desired size at the focal point. That is to say, the device 28 may be used to limit the size of the projected spot at the focal point 32. With the apparatus of the present invention it is desirable that this spot be very small, typically in the submicron range since the diameter of a magnetized area on the disk will be about 1 micron.

A typical magneto-optic disk 34 includes a thin base film portion 35 of a magnetizable rare earth-transition metal alloy material and an overlying protective translucent coating 36 of a plastic material, for example, through which the beam 15 readily passes without distortion. On the base portion 35 of the disk are a plurality of concentric or spiral tracks formed as land portions 38 separated by grooves to space the data radially on the disk. The disk (only a small fragment of which is shown as an enlarged section in the drawing) is then rotated rapidly beneath the vertically imposed beam 15 so that the beam will scan along one of the tracks 38 to read the information thereon.

As with conventional magneto-optic read-write technology, the polarization plane of reflected beam from the focal point 32 on the surface of a magnetized track 38 will be rotated by a predetermined amount (typically from about $\frac{1}{4}$ to about $\frac{1}{2}$ degree) either in a positive or a negative direction relative to the polarization plane of the transmitted beam 15 depending upon the vertical direction of magnetization of the bit recorded on the track 38 and upon which the beam spot is focused. This reflected and polarization plane rotated beam 15 is redirected back through lens 30 and stop 28 to the turning mirror 26 which reflects it in the path coincident with that of the transmitted beam through lenses 20 and 24 and the pinhole plate 22. At the polarizing beam splitter 18, that polarization plane component of the reflected beam which is orthogonal to the polarization plane of the transmitted beam 15 will be deflected along beam path 39 to the photodetector 44 to provide the output signal. It will be recognized that the amount of light deflected at the beam splitter will be quite small since it will comprise the sine component of a very small angle (either plus $\frac{1}{4}$ to $\frac{1}{2}$ degree or minus $\frac{1}{4}$ to $\frac{1}{2}$ degree). While the amount of available light deflected can be significantly increased using a conventional beam splitter at 18 and such a system would be easier to align, this has the disadvantage of also deflecting internal reflections from the optical system, particularly from the face of the pinhole plate 22, which light would interfere with the reading to be obtained by the photodetector. Thus, using a polarizing beam splitter at 18 has the advantage that all reflected light from the internal components of the optical system, which will be in the same polarization plane as the transmitted beam 15, will be passed straight through the polarizing beam splitter and will not affect the accuracy of the output reading.

The deflected beam 39, which will be at a rotated polarization direction at an angle slightly greater or slightly less than the polarization direction angle of transmitted beam 15, is turned by a mirror 40 and directed to a polarizer, or analyzer, 42. The polarization direction of analyzer 42 is arranged to be orthogonal to one of the two potential polarization directions of the reflected beam from the magnetized medium 34 so as to block the further transmission of such beam. A reflected beam at the other polarization direction will have a sine component at twice the rotated angle which will pass through the analyzer 42 to the photomultiplier tube 44 to be read. Thus, the analyzer 42 conventionally discriminates between the two possible polarization directions of the reflected beam permitting the PMT 44 to correctly sense the output. For example, if the analyzer 42 is set orthogonally to the positively rotated beam, then a low signal at the PMT signal output 44 will indicate positive rotation of the beam. On the other hand, if a negatively rotated beam is directed to the analyzer 42, a relatively high signal will be sensed by PMT 44.

With the spot from the optical system 10 at the focal point 32 being significantly smaller (e.g., about 0.3 microns) than the diameter of a magnetized area (about 1 micron) on the disk, the laser beam 15 can be utilized to measure the magnetized area on the magneto-optic disk 34 and to locate it with respect to the land portion 38 edges and the adjacent grooves. This can be accomplished by utilizing the optical scanning system shown and described in U.S. patent application Ser. No. 725,082 to Lindow et al, filed Apr. 19, 1985, and now U.S. Pat. No. 4,689,491 issued Aug. 25, 1987, which is incorporated by reference herein.

Although the best mode contemplated for carrying out the present invention has been herein shown and described, it will be apparent that modification and variation may be made without departing from what is regarded to be the subject matter of the invention.

What is claimed is:

1. A scanning optical system for reproducing information recorded in a magnetic recording storage medium by utilization of the interaction between a focussed light beam and the magnetized storage medium, said system comprising
    means for supplying a polarized light beam;
    a beam splitter positioned in the path of said light beam to pass at least a portion of the light beam to the medium and with the reflected beam from the medium being at least partially deflected by the beam splitter;
    a pinhole plate positioned between the beam splitter and the medium including a pinhole therein for receiving both the transmitted and reflected beams and thereby providing a confocal optical system;
    an objective lens positioned in the beam paths between the pinhole plate and the medium for focusing the beam to a small spot on the medium;
    an analyzer for receiving the deflected beam from the beam splitter with its polarization direction being selected so as to discriminate between the differing polarization plane angles through which the reflected beam can be rotated relative to the transmitted beam by the medium; and
    a photodetector connected to receive the beam transmitted through the analyzer for providing an output signal.

2. A scanning optical system according to claim 1 wherein the polarization direction of the analyzer is orthogonal to one of the polarization directions to which the transmitted beam polarization plane is rotated by the medium.

3. A scanning optical system according to claim 1 wherein the beam splitter is a polarizing beam splitter with its polarization direction aligned with the polarization direction of the transmitted beam from the laser.

4. A scanning optical system according to claim 2 wherein the beam splitter is a polarizing beam splitter with its polarization direction aligned with the polarization direction of the transmitted beam from the laser.

5. A scanning optical system according to claim 1 including a lens for contracting the transmitted beam from the laser to focus it at the pinhole in the pinhole plate.

6. A scanning optical system according to claim 5 including an expansion lens for redirecting the transmitted beam to the medium after it has passed through the pinhole plate.

7. A method of reproducing information recorded in a magnetic storage medium by utilization of the interaction between a focussed light beam and the magnetized storage medium, said method comprising
    transmitting a high quality polarized light beam and focussing it to a small spot on the medium,
    providing a pinhole through which both the transmitted beam and the reflected beam from the surface of the medium pass,
    deflecting at least a portion of the reflected beam at a position between the beam source and the pinhole and directing it to a photodetector,
    discriminating between a beam whose polarization plane is rotated in one direction by the magnetized medium and a beam whose polarization plane is rotated in the opposite direction by the medium at a position between the reflected beam deflection position and the photodetector so that the photodetector output will provide an indication of the direction of magnetization of the medium at the spot,
    and scanning along said medium with said beam to distinguish between successive areas thereon of different magnetization directions.

8. A method according to claim 7 wherein said information is reproduced from said photodetector at a rate so as to provide a measurement of the length on the medium of each continuous area of the same magnetization direction.

9. A method according to claim 7 wherein both the transmitted beam and the reflected beam are focussed at the pinhole.

10. A method of reproducing information recorded in a magnetic storage medium by utilization of the interaction between a focussed light beam and the magnetized storage medium, said method comprising
    transmitting a high quality polarized light beam and focussing it to a small spot on the medium,
    providing a pinhole through which both the transmitted beam and the reflected beam from the surface of the medium pass,
    deflecting a portion of the reflected beam at a position between the beam source and the pinhole and directing it to a photodetector,
    discriminating between a reflected beam whose polarization plane has been rotated in a particular direction by the magnetization of the medium and other reflected beams so as to pass only a component of the polarization plane rotated beam to the photodetector,
    and scanning along said medium with said beam to distinguish between successive areas thereon of known length on the basis of detecting those areas from which the polarization plane of the received beam has been rotated in said particular direction.

11. A method according to claim 10 wherein said information is reproduced from said photodetector at a rate so as to provide a measurement of the length on the medium of each area which has been magnetized to produce said particular direction of rotation of the polarization plane of the beam reflected therefrom.

12. A method according to claim 10 wherein both the transmitted beam and the reflected beam are focussed at the pinhole.

* * * * *